A. F. GUNSTONE.
DETACHABLE RIM FOR WHEELS OF ROAD VEHICLES.
APPLICATION FILED APR. 14, 1910.

1,083,321.

Patented Jan. 6, 1914
4 SHEETS—SHEET 1.

A. F. GUNSTONE.
DETACHABLE RIM FOR WHEELS OF ROAD VEHICLES.
APPLICATION FILED APR. 14, 1910.

1,083,321.

Patented Jan. 6, 1914.
4 SHEETS—SHEET 4.

UNITED STATES PATENT OFFICE.

ARTHUR FREDERICK GUNSTONE, OF BATH, ENGLAND, ASSIGNOR TO "CAPTAIN" MOTOR WHEEL COMPANY LIMITED, OF BRISTOL, ENGLAND.

DETACHABLE RIM FOR WHEELS OF ROAD-VEHICLES.

1,083,321.

Specification of Letters Patent. Patented Jan. 6, 1914.

Application filed April 14, 1910. Serial No. 555,482.

*To all whom it may concern:*

Be it known that I, ARTHUR FREDERICK GUNSTONE, a subject of the King of England, residing at Bath, in the county of Somerset, England, have invented certain new and useful Improvements in Detachable Rims for Wheels of Road-Vehicles, of which the following is a specification.

This invention is for improvements in or relating to detachable wheel rims for motor or other road vehicles of the type that is moved axially on to and from the felly and has for its main object to provide such a rim that shall not tend to work off the felly. Usually these rims are made to slide easily over the felly but one feature of this invention consists in providing a rim that is a tight fit on the felly and requires mechanical means to place it on or remove it from the felly.

The invention further relates to details of construction and a preferred form of carrier hereinafter fully described with reference to the accompanying drawings wherein—

Figure 5:
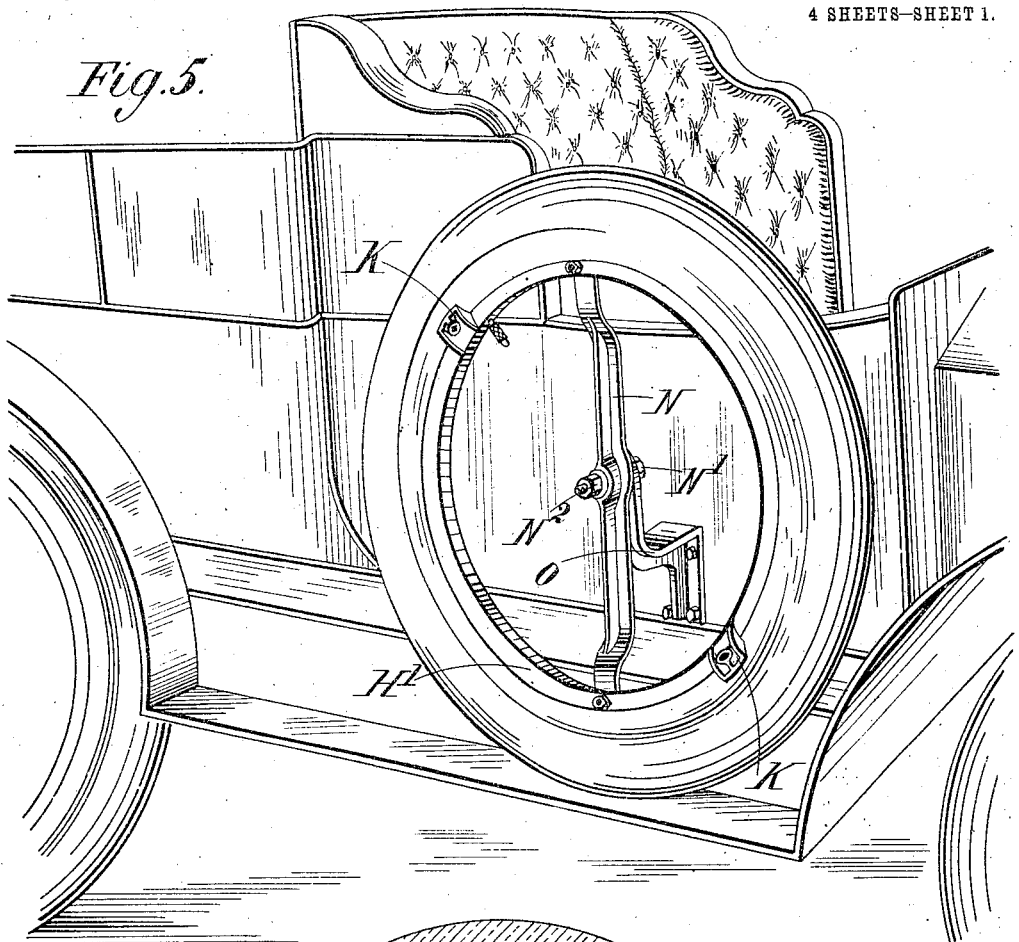
Figure 1:
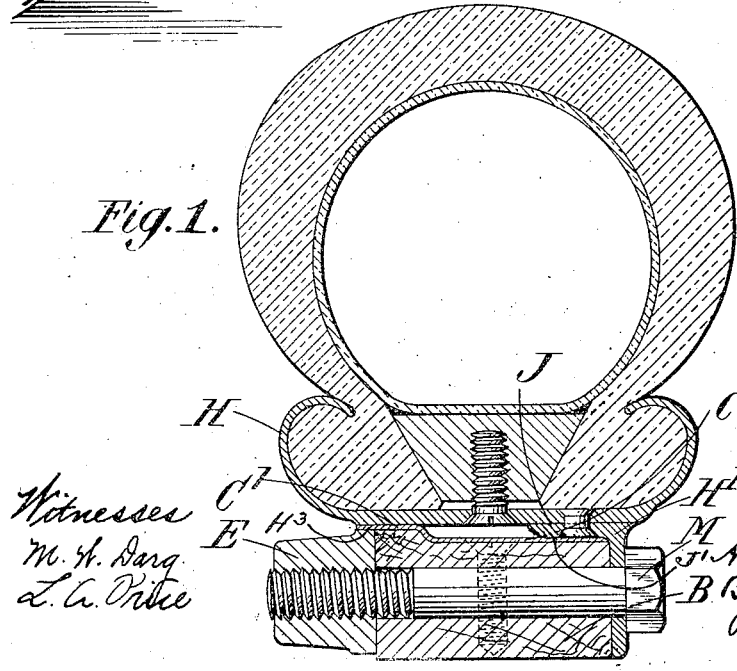
Figure 2:
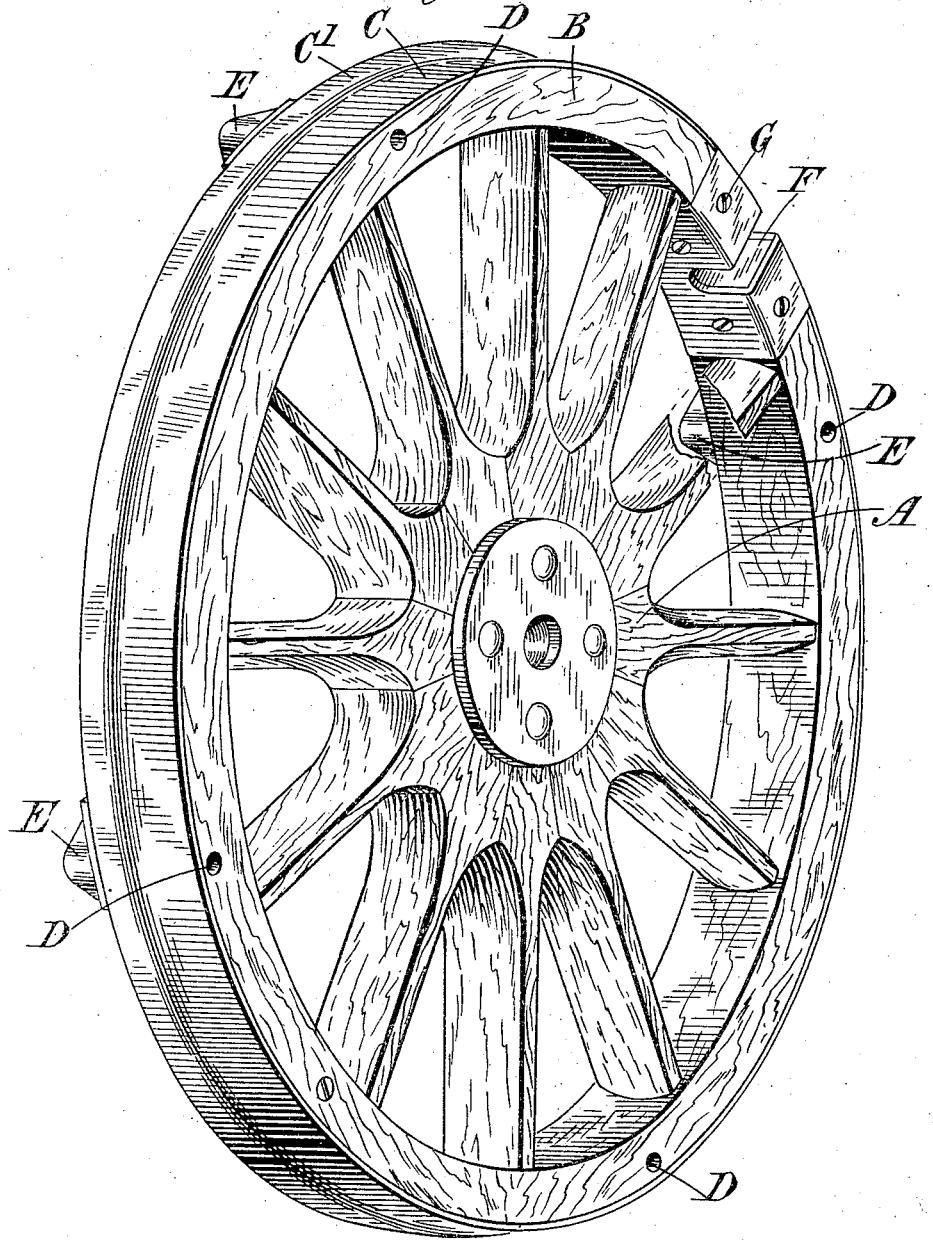
Figure 3:
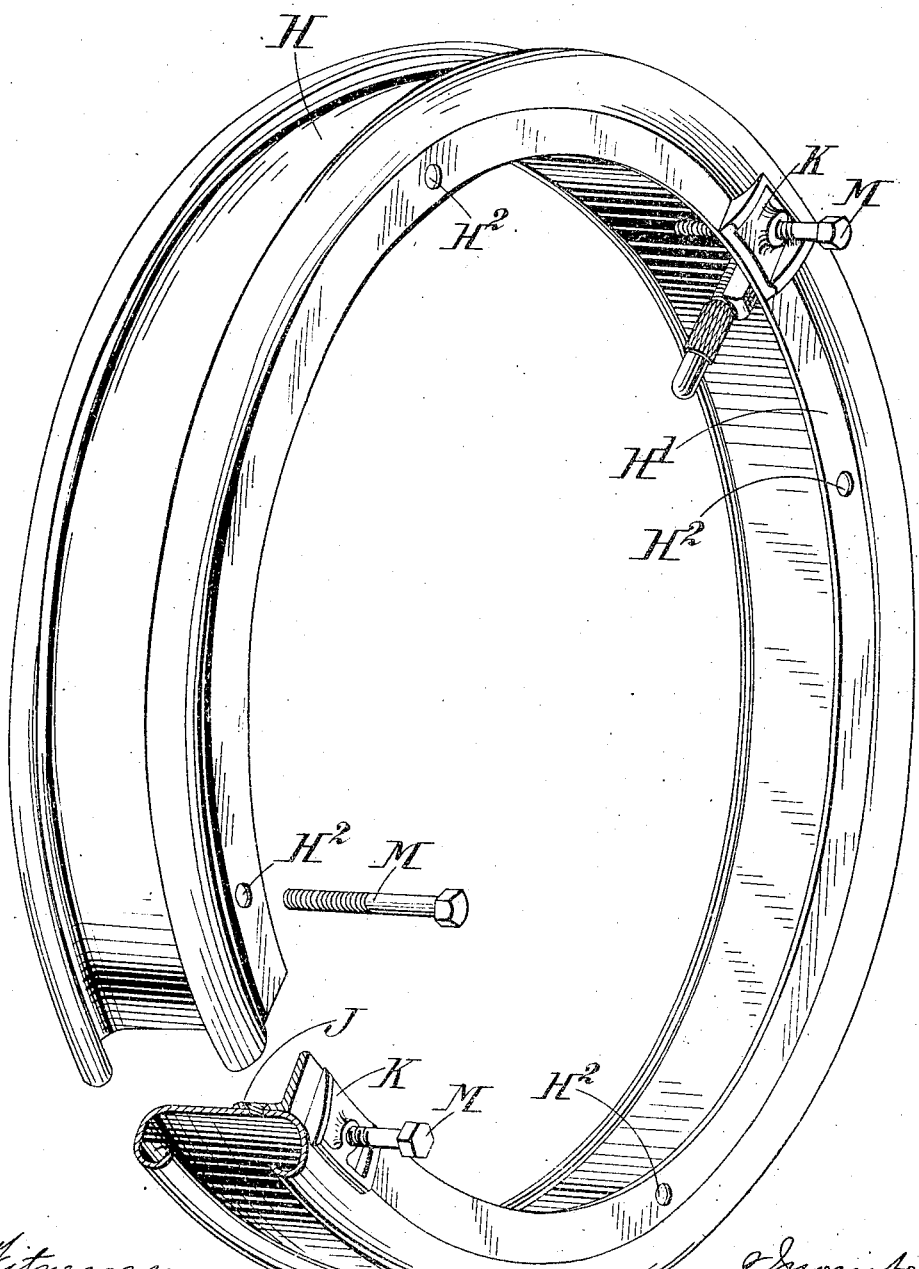
Figure 4:
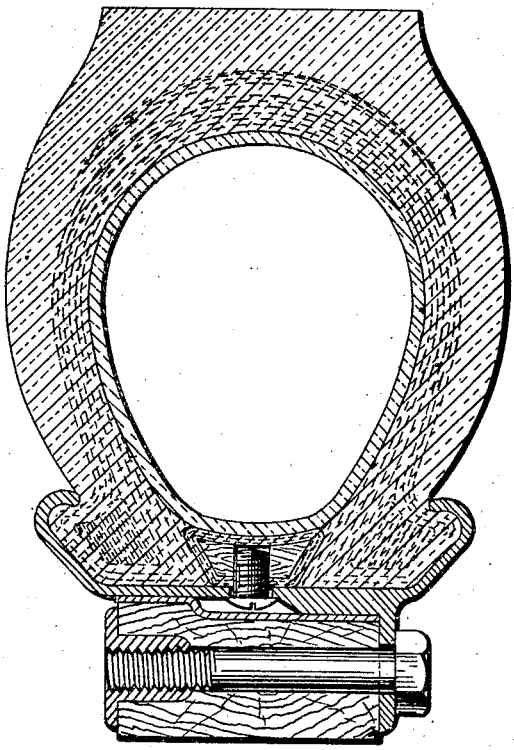

Figure 1 is a transverse section of the wheel felly showing the rim in position, Fig. 2 is a perspective view of the wheel with the rim removed, Fig. 3 is a perspective view of the wheel rim detached from the felly, Fig. 4 is a transverse section of the wheel felly showing a slightly modified construction of rim which falls within the scope of this invention, and Fig. 5 is a perspective view of a wheel rim secured to a vehicle by a rotatable carrier.

Like letters indicate like parts throughout the drawings.

A wheel A has a felly B that is surrounded by a metal band C that is cylindrical in form and has a step $C^1$ on the inner edge. Holes D are drilled transversely through the felly and on the inner side opposite the holes are secured screw-threaded sockets E. The felly is slotted at F to receive the tire valve and a slotted L-shaped strengthening plate G is provided at this point. The plate is secured by screws that enter the felly from two different sides.

A wheel rim H has an inwardly directed side flange $H^1$ that has in it holes $H^2$ which register with the holes D in the felly. The flange $H^1$ has an L-shaped cross section and is riveted to the inside of the rim H thereby forming a step J at one edge. The bearing face $J^1$ of this step is cylindrical and makes a tight fit with the corresponding cylindrical face of the band. Also the bearing face $H^3$ on the opposite side of the rim is cylindrical and makes a tight fit with the cylindrical face provided by the step $C^1$ of the band.

Secured to the flange $H^1$ are two screw-threaded lugs K, one being placed near the tire valve and the other approximately opposite thereto.

The operation of this device is as follows:—The rim H is passed over the felly from that side shown at the right in Fig. 2 (which for convenience may be called the near side, as this is always toward the operator) until its edge strikes the near side of the step $C^1$. Bolts M are then introduced through the holes $H^2$ in the flange and holes D of the felly and screwed into the sockets E. These bolts draw the rim forcibly on to the felly, so that it finally assumes the position shown in Fig. 2 and is securely held by its tight fit and by means of the bolts. As will be seen the step on the felly and the step on the rim leave a central space between the rim and felly which, however, is not novel as rims with steps leaving a central space have before been employed. To detach the rim from the felly the bolts M are unscrewed and one or more of the same screwed into the lugs K until their ends bear against the felly and force the rim therefrom. One of the lugs being near the valve the L-shaped plate will form a good bearing for the end of the screw.

Instead of riveting the inwardly directed flange $H^1$ to the rim, the flange may be formed integral with the rim as shown in Fig. 4. Preferably the rim is made of rolled material and it is believed that this is a considerable element in making it possible to use a rim that is sufficiently small to fit with the required degree of tightness on the felly. A rolled rim, although apparently truly circular, has a somewhat wavy surface, which it is believed makes the whole rim resilient and that in forcing such a rim on to the felly this waviness enables the rim to stretch more than would be the case if it were turned from a casting.

It is found that with a felly $23\frac{1}{10}$ inches in diameter a rim can be used whose shortest interior diameter is 23 inches. These dimensions are only given by way of example, as the precise relative sizes will vary according to circumstances.

To enable the rim with a tire thereon to be carried as a spare, the inwardly directed flange H¹ may be used for securing it to a suitable support. The support preferred is a carrier that conveniently takes the form of a double arm N pivoted at its center by means of a bolt N¹ to a bracket O. The arm N is kept in place on the bolt N¹ by a nut N² which may be tightened to hold the arm N rigid or loosened to allow it to rotate about the bolt. At the ends of the arm N are screw-threaded orifices.

To secure the rim to the carrier it is placed over the ends of the arm N so that they bear against the side flange H¹. Bolts are inserted through the holes in the flange and screwed into the orifices of the carrier, thus holding the rim rigidly in place. It will be seen that a tire while on the rim and secured in this manner to the carrier can be readily repaired as access can be had to all parts of the tire and the whole conveniently rotated by turning the double arm N of the carrier about its central pivot.

What I claim as my invention and desire to secure by Letters Patent is:—

1. The combination of, a felly of a wheel having a cylindrical face at that side of its outer periphery that is farthest from the vehicle and having an enlarged cylindrical step at the other side of such outer periphery, a band thereon conforming to the shape of the felly and a detachable tight-fitting endless rim surrounding such band having a cylindrical face to engage the step, a cylindrical rib or step to engage the smaller cylindrical portion of the felly-band, an inwardly directed portion on the rim that engages the side face of the felly and is provided with holes registering with holes in the felly, threaded sockets secured to the felly in line with the holes therein and on the side opposite to the said inwardly directed portion, and bolts passing through the said registering holes and screwing into the said sockets for the purpose of securing the rim to the felly, substantially as set forth.

2. In a detachable rim for a road-wheel, the combination of, a tire-carrying endless rim that slides axially onto or from the felly of the wheel, the latter being slotted to receive the valve of the tire, the rim having an inwardly directed portion provided with a screw-threaded orifice that is placed at one side of but in close proximity to the slot, and a bolt for forcing the rim from the felly by inserting it in the screw-threaded orifice, substantially as and for the purpose set forth.

In testimony whereof I have signed my name to this specification in the presence of two subscribing witnesses.

ARTHUR FREDERICK GUNSTONE.

Witnesses:
A. M. HAYWARD,
G. DONALD HARRISON.